United States Patent [19]

Antoszkiewicz et al.

[11] Patent Number: 5,726,877
[45] Date of Patent: Mar. 10, 1998

[54] METHOD FOR THE ADAPTIVE ADJUSTMENT OF THE CONTROL PARAMETERS OF AN ELECTRO-HYDRAULIC AXIS OF MOTION

[75] Inventors: Peter Antoszkiewicz; Jürgen Schmitz, both of Marktheidenfeld; Ulrike Zarneckow, Dietersheim, all of Germany

[73] Assignee: Mannesmann Rexroth GmbH, Lohr/Main, Germany

[21] Appl. No.: 346,889

[22] Filed: Nov. 30, 1994

[30] Foreign Application Priority Data

Dec. 9, 1993 [DE] Germany .................. 43 42 057.5

[51] Int. Cl.$^6$ .................................. G05B 13/02
[52] U.S. Cl. .................. 364/161; 318/609; 364/162
[58] Field of Search .................... 364/157, 161, 364/162, 163, 424.05, 424.01, 424.056; 318/610, 609, 646, 638

[56] References Cited

U.S. PATENT DOCUMENTS

| | | | |
|---|---|---|---|
| 5,043,862 | 8/1991 | Takahashi et al. | 364/162 |
| 5,071,157 | 12/1991 | Majeed | 280/707 |
| 5,295,061 | 3/1994 | Katayama | 364/157 |
| 5,295,074 | 3/1994 | Williams | 364/424.05 |
| 5,310,251 | 5/1994 | Towers et al. | 303/11 |
| 5,398,303 | 3/1995 | Tanaka | 395/51 |
| 5,497,063 | 3/1996 | Day et al. | 318/610 |

FOREIGN PATENT DOCUMENTS 3501568  8/1989  Germany.

OTHER PUBLICATIONS

Andreas Klein, Adaption eines Zustandsreglers mit Hilfe der Fuzzy–Set–Logik, O+P Olhydraulik und Pneumatik, No. 35, 1991, pp. 605–612.

Forschungsfonds, Informationsveranstaltung des Forschungsfonds der Fachgemeinschaft Fluidtechnik im VDMA, O+P Olhydraulik und Pneumatik, No. 37, 1993, pp. 776, 781–783.

Forschungsfonds, Information Session of the Research Fund of the Fluid Technology Group of the VDMA; 1993 (translation).

Primary Examiner—Reba I. Elmore
Assistant Examiner—Robert J. Dolan
Attorney, Agent, or Firm—Emrich & Dithmar

[57] ABSTRACT

The invention relates to a servo hydraulic force controlled system comprising a cylinder, a control valve and a controller as well as a load defining the controlled system. The optimum setting of the controller is automatically performed by using a fuzzy-set-logic, wherein the characteristics of the controlled system must be not known. According to the invention the step response of the controlled system is evaluated with respect to certain geometrical characteristics by means of a fuzzy classificator communicating with a ruling unit which correspondingly varies the control parameters. According to the invention, certain characteristics of the step response are thus used for the fuzzification and the optimizing procedure takes place in a predetermined setting order.

9 Claims, 9 Drawing Sheets

METHOD FOR THE ADAPTIVE ADJUSTMENT OF THE CONTROL PARAMETERS OF AN ELECTRO-HYDRAULIC AXIS OF MOTION

BACKGROUND OF THE INVENTION

1. Field of the Invention

The present invention relates to a method for the adaptive adjustment of control parameters using fuzzy-set-logic for the force control of an electro-hydraulic axis of motion. The term "electro-hydraulic axis" defines a cylinder acting on a component having elastic and damping characteristics, wherein the fluid connection between a pump and a reservoir as well as the cylinder is set by a control valve which is actuated by a controller having at least a proportional and an integral section.

2. Description of the Prior Art

The quality of a closed loop force control heavily depends on the spring rate and the damping of the component or load subjected to the force of the cylinder. Particularly, when replacing a load with a different load having different characteristics with respect to elasticity and damping, a cumbersome resetting of the control algorithms is required.

In order to reduce the need for calculation expenditure which is required to adaptively adjust the controller, in particular for the optimizing process required for the initial operation of a control, the application of the so-called fuzzy-set-logic has been proven to be useful. Accordingly O+P (Ölhydraulik und Pneumatik 37, 1993, No. 10, pages 782 and 783) disclose to associate an adaptive system which is defined by a fuzzy-set-logic to the operational controller for the stroke control of a hydraulic and particularly a pneumatic cylinder. The step response of the cylinder which results from varying the desired value defining the position (either in initiating the operation as well as during operation) is evaluated by the fuzzy-set-logic and consequently a relative variation of the control parameters of the controller is provided. A plurality of steps is necessary for finding the optimum. As may be derived in this connection from " Ölhydraulik und Pneumatik" 35 (1991) No. 8, pages 605 to 612, the system for controling the position of the cylinder referred to is defined by a controller having three loops for the three parameters such as distance, speed and acceleration. For the fuzzy-set-logic certain data is extracted from the step response of the cylinder, i.e. the maximum overshoot from the distance response, the number of the local extreme values from the distance response, speed response and acceleration response as well as the mean distance between a pair of extreme values of the speed or, respectively, the acceleration. Linguistic values are obtained from these data by fuzzification. By evaluating these data the fuzzy-set-logic determines setting rules for the control share values valid for the distance, the speed and the acceleration. Accordingly, setting the control parameters for the stroke control of a cylinder is simplified.

The invention is contrarily concerned with a force control system exhibiting a behavior which is determined primarily by the characteristics of the load. The characteristics of the load are not sufficiently known in most cases and often undergo larger variations during operation. Hence, highly skilled operators are required for optimizing a control, in other words adjusting the control is rather difficult.

SUMMARY OF THE INVENTION

The object on which the present invention is based is thus defined to replace the manual setting of the controller for servo hydraulic force controlled systems of the type above referred to by an automatic process using a fuzzy-set-logic. Particularly, the solution proposed by the present invention shall be based on the assumption that any knowledge of the characteristics of the controlled system is not required.

The method according to the invention is based on the fact that the step response of the controlled system is evaluated by a fuzzy classificator with respect to certain geometrical characteristics and that the fuzzy classificator approaches a control circuitry storing the rules required to vary the control parameters accordingly.

The step response of the controlled system is evaluated with respect to the initial control time, the final control time and the overshoot amplitude. For recognizing superimposed oscillations within the initial control time a function is used producing a rating value depending on whether a pair of subsequent values of the step response are not monotoneous or how many of those non-monotoneous regions are present in the step response. The measured monotony value up to the instant where a maximum overshoot occurs serves to roughly adjust the amplification of the proportional section of the controller. The overshoot amplitude itself is set by varying the integral amplification share to a maximum allowable value or to a zero value of the overshoot amplitude. When the monotony value is measured up to the initial control time of the step response, a fine adjustment of the proportional amplification share of the control can be thus obtained. According to a particularly useful embodiment of the invention the variation of the control parameters takes place in the sequence just explained.

For further optimizing the process, the speed representing a disturbance variable is additionally applied to the control output and adding the disturbance value is varied by selecting a multiplicative factor in order to optimize the ripple content and accordingly the overshoot amplitude of the step response. This optimizing procedure may be improved by evaluating further geometrical characteristics of the step response, such as the maximum amplitude of the limit cycle and the difference between the first maximum of the overshoot of the step response and the subsequently following minimum.

Still further, an operator is defined for judging the optimizing success, which operator defines the relation between improving the optimizing process and the number of the optimizing steps required. In case there is no substantial progress in optimizing, the optimizing process is terminated in response to the increasing number of optimizing steps.

Still further, it is possible to arrive at a judgement of how far the system currently investigated is remote from the known field of knowledge by making a comparison with known controlled systems with respect to particular characteristics which can be measured, such as spring rate, dry friction etc. In addition, a variable may be introduced which is derived from the relationship of known characteristics and present characteristics of a controlled system. Based on this variable, it may be evaluated whether or not a reliable optimizing of the controller is possible according to the field of knowledge relied on.

BRIEF DESCRIPTION OF THE DRAWINGS

The invention will be described in some detail as follows referring to the illustrations which show.

DESCRIPTION OF THE PREFERRED EMBODIMENT

Figure 1:
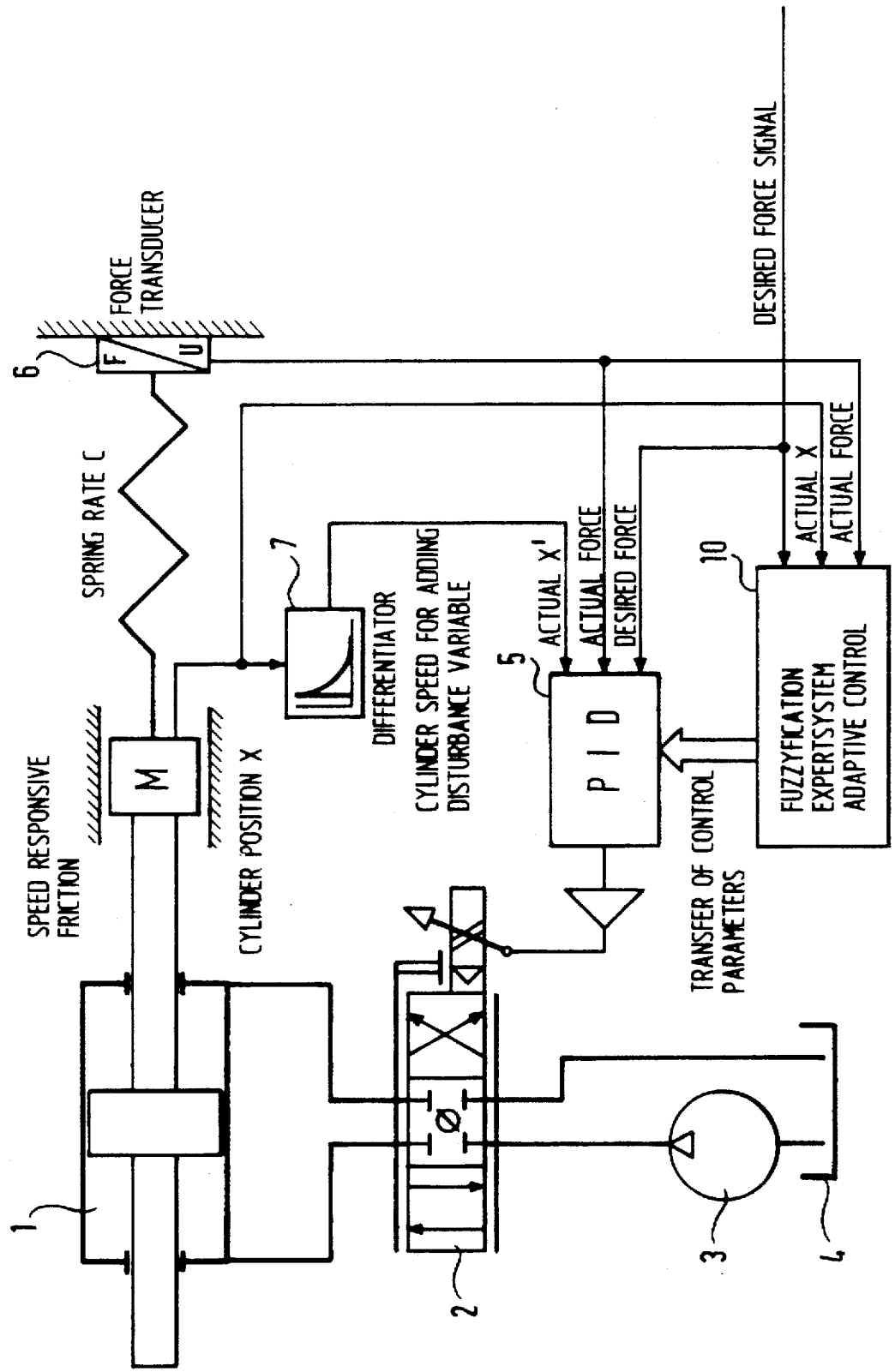
FIG. 1 is a diagram of a force control system in accordance with the invention.

FIG. 1 shows a schematic view of a force control system comprising a cylinder 1, a control valve 2 controlling the fluid connections between a pump 3 and a reservoir 4 and the cylinder 1, and a proportional-integral controller 5 which may additionally include a differentiating section. The cylinder 1 acts on a load M defining the means to be controlled having a certain spring rate C. The force applied by the cylinder to the load is measured by a force transducer 6. This actual value of the force F measured by the transducer 6 is supplied to an input of the controller 5. A voluntarily adjustable desired value of the force F and a disturbance variable signal representing the speed of the cylinder are supplied to further inputs of the controller 5. For obtaining the disturbance value signal, the cylinder position x is measured and the speed of the cylinder is produced in a differentiating circuit 7. The controller 5 is connected to a fuzzy classificator 10 receiving the step response defined by the actual value of the force and further receiving the cylinder position or the cylinder speed representative for the disturbance variable as well as the value for the desired force resulting in the step response.

The fuzzy classificater 10 defines associated functions with respect to the following functions: Initial control time, overshoot amplitude, stiffness of load, monotony of the step response, limit cycles and optimizing progress. This will be explained as follows:

The so-called initial control time (as defined in the listing of abbreviations enclosed) of the step response may be considered to be a measure for the dynamic and the overshoot amplitude as a measure for the stability. The functions of association are not directly produced by using the signals. The functions are rather derived from producing the ratio with respect to a known standardized control system (the identification of the step response of the closed loop controlled system as a PT2 component does not yield useful results as tests showed).

By sampling the spring characteristics in the allowable range of operation, information of the spring rate may be obtained. Thus a standard stiffness of the load may be determined in the manner described above.

The behavior with respect to oscillations during the leading edge of the step response may be evaluated by means of a monotony function. This could be defined as follows:

An evaluating value q is set to "zero" at the beginning of the step response.

If during the step response a following actual value is smaller than a previous value, the value q is increased by a "one".

When the actual value next following to a non-monotoneous actual value is also not monotoneous, q is increased by a progressive value. Still further, the number of the non-monotoneous areas of the actual value may be also considered for escalating the evaluation signal.

For evaluating the limit cycles one can utilize the relative oscillation amplitude of the actual value for a stationary drive.

The percent improvement of the initial control time per adaptive step may be used for evaluating the progress of optimizing.

Associated functions may be defined alike with respect to the functions of the relative stiffness of the load, monotony function, relative oscillation amplitude and progress of optimizing.

The associated functions described so far are combined with the rules of an inference machine, the rules following from the simulation. For this, the knowledge of the sequence of the optimizing parameters may be of an important help, as one parameter after the other ($V_r, r_x, T_n$) will be optimized as mentioned above until the optimizing step becomes sufficiently small.

During this process the inference machine does not vary the very control parameters, but the relative increments thereof until the last control parameter is optimized and then the drive is indicated to be ready for operation. The procedure above referred to results in a sequence as follows:

Based on a certain control setting (generally not at an optimum) and a certain load (spring stiffness, sticking friction), a step signal of the desired value is supplied to the controlled system (for example 1.000 N) and the corresponding step response is measured; the measured step response signal is then evaluated and the relevant values are supplied to the fuzzy evaluation (fuzzification); the fuzzification determines variations for optimizing the parameters of the control (defuzzification), and a further step response simulation is repeated using the updated control values.

Figure 2:
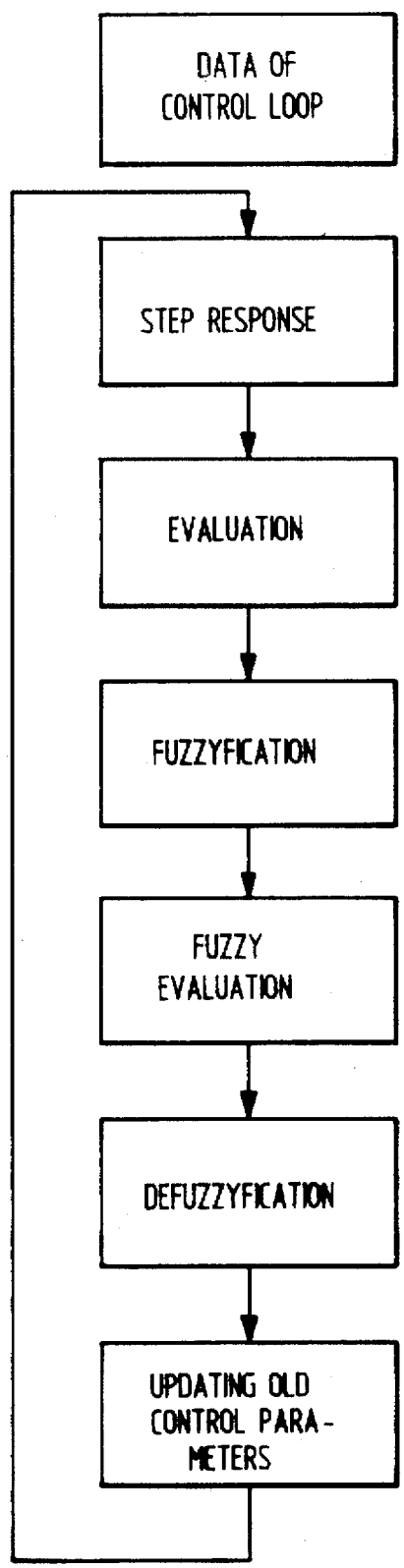
FIG. 2 is a flow diagram of an optimizing process performed by the system of FIG. 1.

FIG. 2 shows a flow diagram of the programmed procedure.

In the following the terms overshoot amplitude, monotony value and so on of the step response will be defined in details. In this connection one is further referred to the listing of the abbreviations enclosed.

Overshoot amplitude (ueber, t-ueber)

A substantial characteristic of the step response is the overshoot amplitude. To obtain for it a standard value, the overshoot amplitude measured in the step response signal is divided by the desired value $$F_{max} = F_{max} \div F_{soll}$$

Formula I: calculation of ueber

Furthermore, it may be useful to know the instant of the maximum actual value since the curve runs through an increasing region before reaching the maximum value. This increasing region shows outstanding characteristics, i.e. the monotony value and ripple content.

Monotony value (g)

A further substantial characteristic of the step response is its behavior while being in the increasing region. It is possible that the function does not increase strictly monotoneous. This can be defined by the monotony value. For this, each actual value is compared with the previous value when sampling the current measuring values. When the actual value is smaller, then the monotony value is increased by a "one".

$$F_n<F_{n-1}\rightarrow q+1$$

Formula 2: Calculation of q

Furthermore, the time period of this discontinuity may be considered. Now, when the value following the actual value is again smaller, the evaluating factor is increased by "one". The monotony value, however, does not increase by a "one", but by the evaluating factor, i.e. progressive (formula 3):

$$F_{n+1}<F_n\rightarrow(bew+1)\&(q+bew)$$

Formula 3: Calculation of q with additional evaluation

Ripple content (well)

Within the increasing region of the step response curve, a ripple content may be observed which, however, has nothing to do with the monotony just explained. The ripple content may be determined by the second differentiation of the force, since it represents an oscillation about the zero line. For this, one adds the number of zero crossings as ripple content value as follows:

$$F=0\rightarrow well+1$$

Formula 4: Calculation of ripple content

Initial control time (tein, tein1)

As referred to in defining the object of the invention, the initial control time is a representative value for the dynamic of the controlled system. To determine this magnitude, the instant value tein is determined where the actual value enters a tolerance range which is valid for the desired value, the actual value not leaving anymore this range. Furthermore, this allows to calculate the instant value tein1 at which the actual value leaves the lower limit of this tolerance range for the first time.

Differentiations of force (F=x, F'=xn, F"=xnn)

As already described for determining the ripple content, certain values (for example the ripple content) may be calculated more simply by using the first and second differentiation of the force.

Limit cycles (gr-zyk, gr-max)

For a number of operational conditions a consideration of the limit cycles plays an important role. Limit cycles define stable permanent oscillations (closed trajektory in the operational space) of the actual force value in a stationary state about the desired force value. This phenomenon is due to sticking friction.

For evaluating one uses again the number of the zero crossings of the second differentiation of the actual force value but after reaching the stationary final value.

$$\ddot{F}=0\rightarrow grenz+1$$

Formula 6: Calculation of a value for limit cycles

In addition, the maximum amplitude of the oscillation with respect to the desired force value is determined (formula 7). Limit cycles always occur, but they can be accepted when the maximum amplitude does not exceed a certain limit value.

$$\ddot{F}_{Grenzmax}=F_{Grenzmax}\div F_{soll}$$

Formula 7: Calculation of gr_max

The fuzzy adaption of the control parameters is explained as follows:

There are the following relationships between the shape of the curve and the control parameters as derived from the step response.

When the step response overshoots, the resetting time of the integral share must be increased;

when the monotony value is too large, the amplification of the proportional share is too high;

ripple contents in the increasing region of the curve may be smoothened out by applying the disturbance value of the speed having the proper sign (when the factor is too high, an overshooting may result);

when limit cycles are produced, their amplitudes may be decreased by reducing the proportional share.

From this the following settings result:

Setting of the proportional and integral share without application of a disturbance value:

an overshooting may be compensated by setting an integral share, while the overshooting does not change anymore when the proportional share will be increased (the same is valid for later adding the disturbance value);

the limit cycles and the monotony value may be varied only by the proportional share.

Now adding the disturbance value:

While improving the ripple content, overshoot may again result, but this may be controlled only by varying the speed factor, thus this type of overshoot is independent of the integral share. When the ripple content increases, while supplying the speed signal, the wrong sign for the factor has been selected.

It is useful to consider the optimizing progress for each setting step. From the improvement of the relevant measuring magnitudes, one can draw conclusions for the required "strength" of the setting.

According to the invention the following setting sequence is considered to be particularly useful:

1. Step: Measuring a monotony value up to the instant of the maximum overshoot, followed by a setting of the proportional amplification in order to bring the signal determined towards zero (coarse setting of the proportional amplification).

2. Step: Setting the integral amplification such that a high dynamic is obtained for a maximum allowable overshoot.

3. Step: Reoptimizing the proportional amplification by measuring the monotony value up to the initial control time, followed by resetting (fine setting of the proportional amplification).

4. Step: Supplying and optimizing the disturbance value signal.

Figure 3:
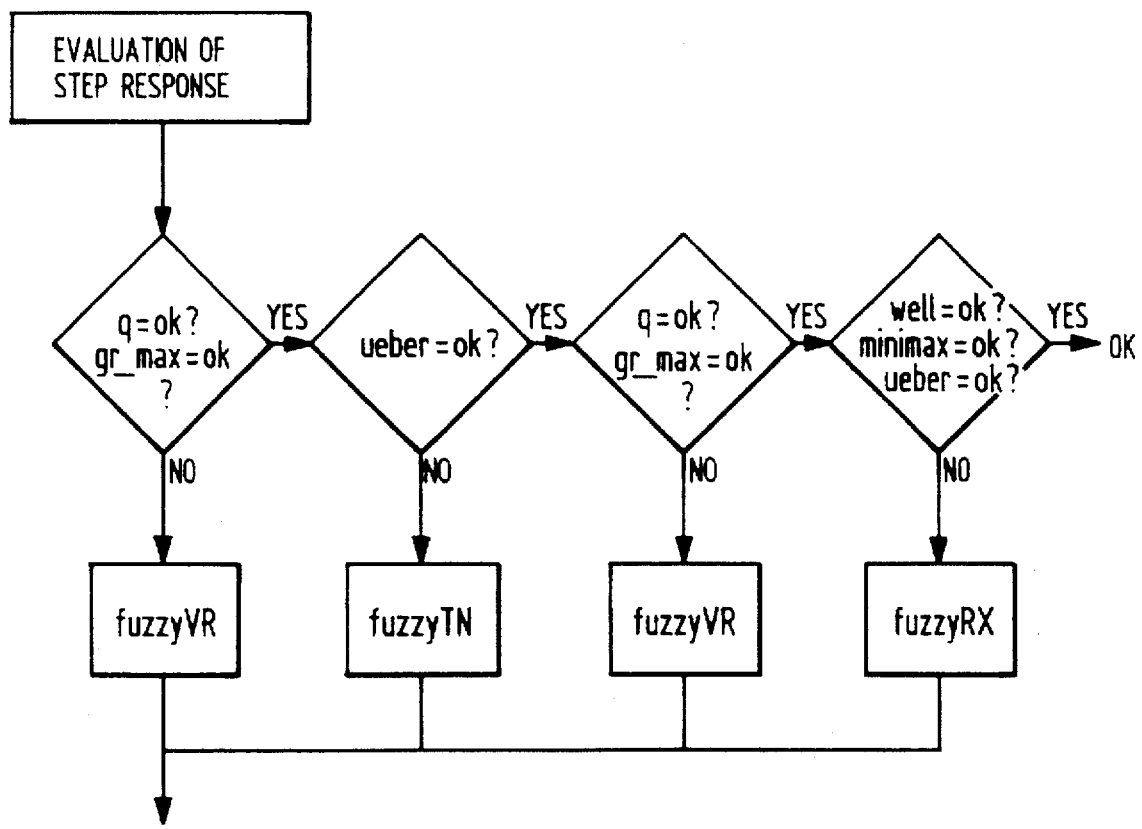
FIG. 3 is a diagram of the evaluating process in the optimizing process of FIG. 2.

FIG. 3 shows the order of setting in a flow diagram. According to FIG. 3, the evaluation of the step response includes for optimizing the process in supplying the disturbance variable, a further inquiry each in the first as well as in the third and forth step which inquiry additionally varies and optimizes the setting of the proportional share and of the multiplicative factor for the speed of the cylinder.

For terminating the optimizing process, the following conditions thus prevail:

1. Step: The process may be terminated when the monotony value q=0. This results in a coarse optimizing of the proportional amplification. Then an additional inquiry takes place $$gr\_max<UEBER\_MAX$$

2. Step: The resetting time for the integral share of the controller is at an optimum provided:

UEBER_MIN≦ueber≦UEBER_MAX

Here UEBER_MIN=1.0 and UEBER_MAX=1.01.

3. Step: For finally optimizing the proportional amplification, an inquiry again follows for q=0

In addition, the variation dvr of the amplification is evaluated:

DVR_MINMIN≦dvr≦DVR_MAXMIN

Here DVR_MINMIN=0.9 and DVR_MAXMIN=1.15.

For a further final optimizing of the proportional amplification there is an additional inquiry for gr_mx<GRENZ_MAX wherein GRENZ_MAX=1.005 (must be smaller than UEBER_MAX).

4. Step: Applying the disturbance value is evaluated with respect to overshoot. The following must be valid:

UEBER_MIN≦ueber≦UEBER_MAX

Furthermore the variation of amplification drx is additionally evaluated:

DRX_MINMIN≦drx≦DRX_MAXMIN

Here DRX_MINMIN=0.9 and DRX_MAXMIN=1.15.

For further optimizing the disturbance value application there is a further inquiry for ueber>=UEBER_MIN_RX, ueber<=UEBER_MAX and minmax<=GRENZ_MAXMIN wherein UEBER_MIN_RX=0.99 and GRENZ_MAXMIN=0.005.

The fuzzy classificator now produces, as it is known, the variations of the values for the proportional share, the integral share and the disturbance value corresponding to the respective input signals obtained from the step response by using the linguistic variables. For this the classificater makes use of the known fuzzy inference, i.e. the control parameter will be either decreased, increased or is maintained.

Figure 4:
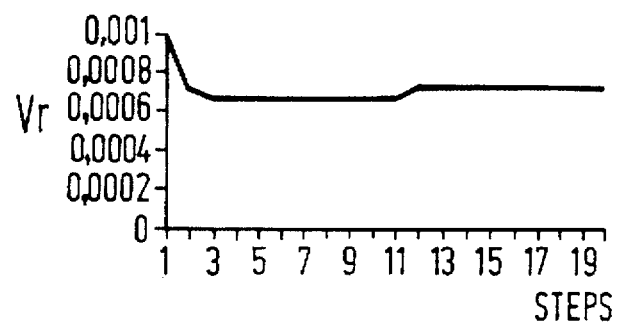
FIG. 4 is a graph of varying the proportional share in various adaptive steps.
Figure 5:
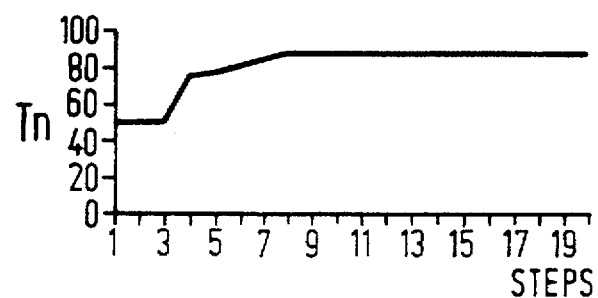
FIG. 5 is a graph of varying the integral share in various adaptive steps.
Figure 6:
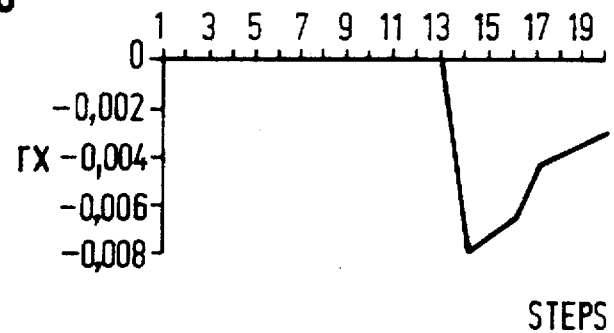
FIG. 6 is a graph of varying the disturbance variable in various adaptive steps and FIGS. 7A–7S are graphs of variation of a desired input signal with time in an optimizing process performed in a total of 18 steps.

FIGS. 4 to 6 show how the setting of the control is varied while the individual optimizing steps follow each other until the setting approaches an optimum. As may be already seen from the above-explained setting sequence, the rough setting of the proportional share $V_r$ is performed in the adaptive steps 1 to 3, followed by setting the integral share in the steps 3 to 11 and subsequently the fine setting of the proportional share while the steps 11 to 13 are performed and finally the disturbance value is additionally evaluated which disturbance value is varied in the steps 13 to 19.

Figure 7A:
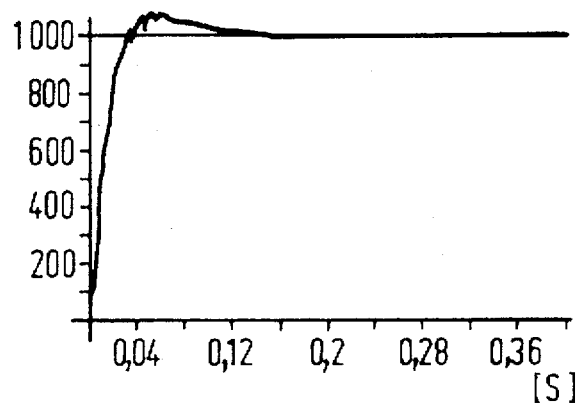
Figure 7B:
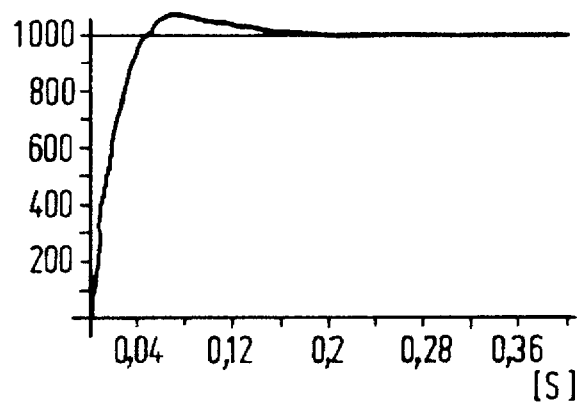
Figure 7C:
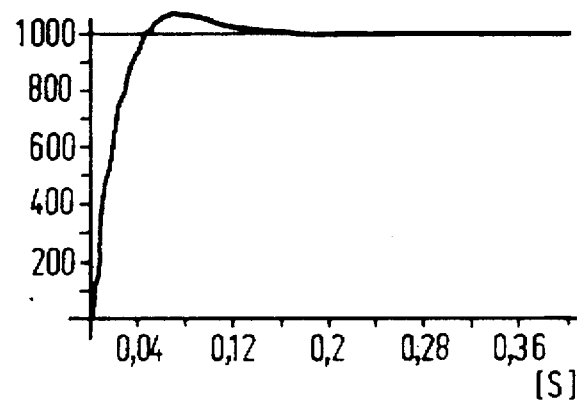
Figure 7D:
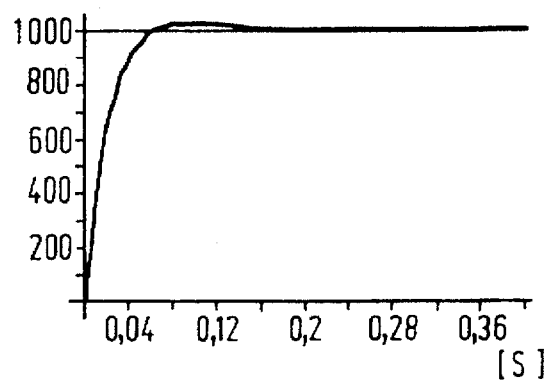
Figure 7E:
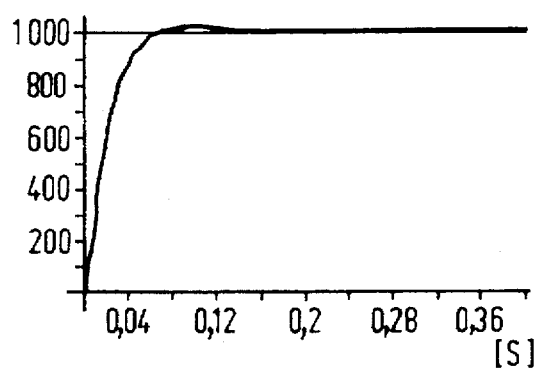
Figure 7F:
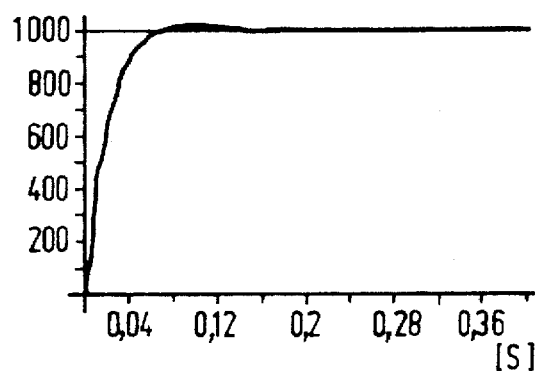
Figure 7G:
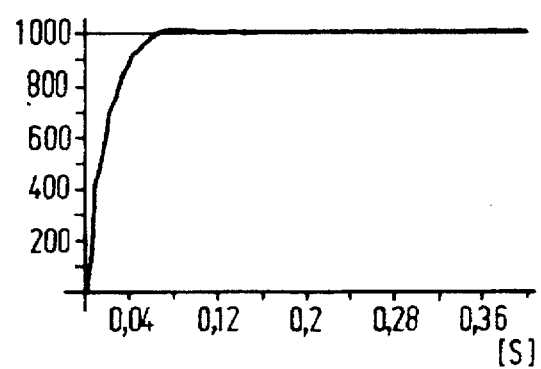
Figure 7H:
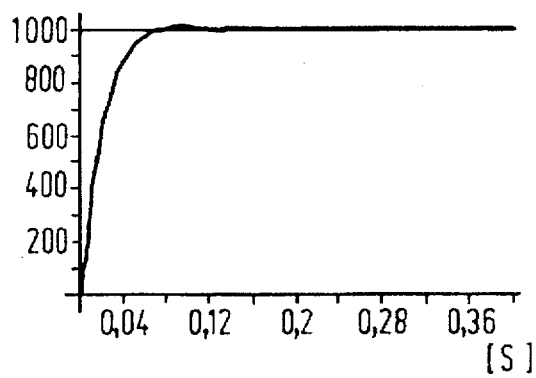
Figure 7I:
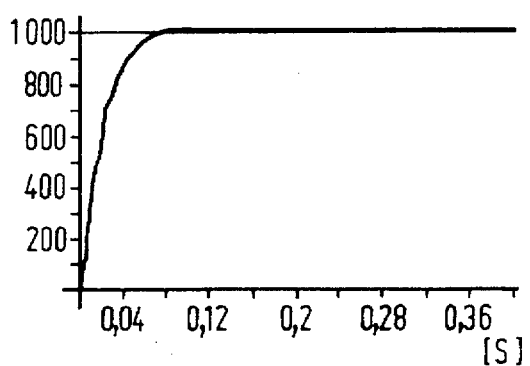
Figure 7J:
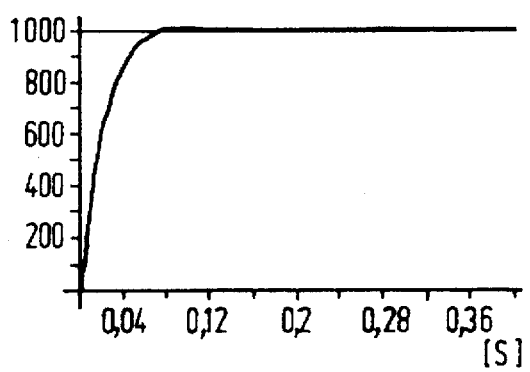
Figure 7K:
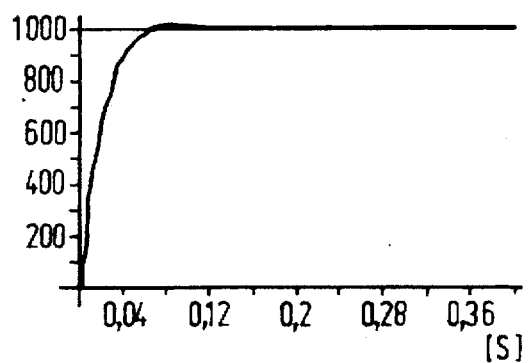
Figure 7L:
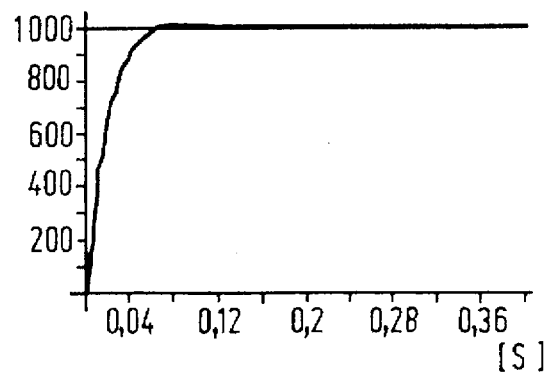
Figure 7M:
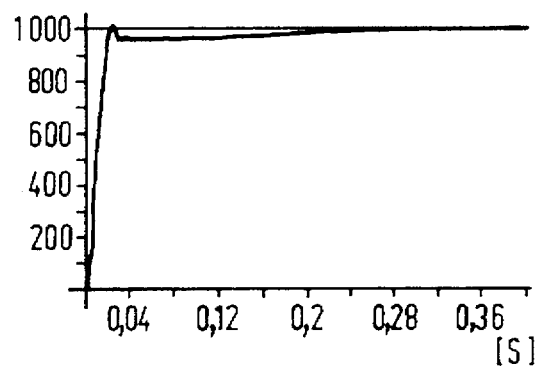
Figure 7N:
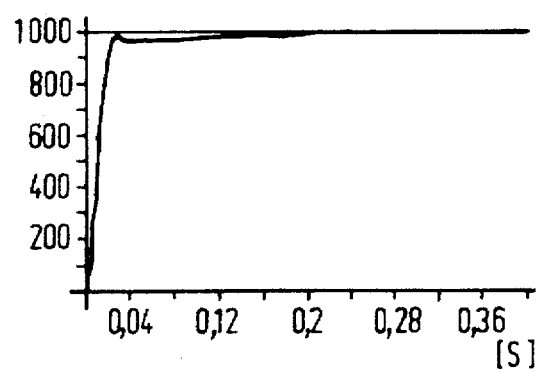
Figure 7O:
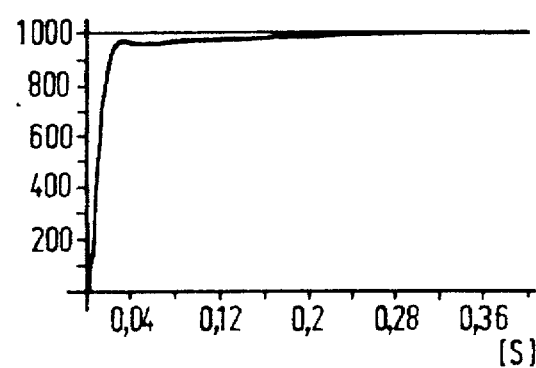
Figure 7:
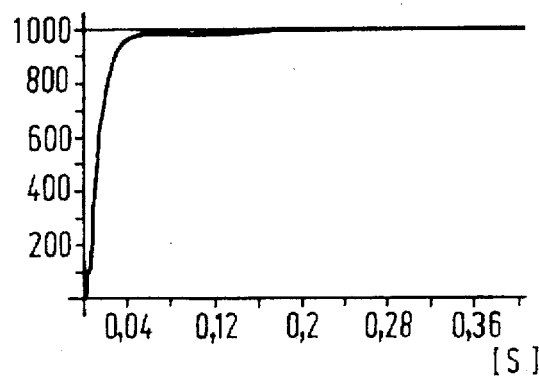
Figure 7:
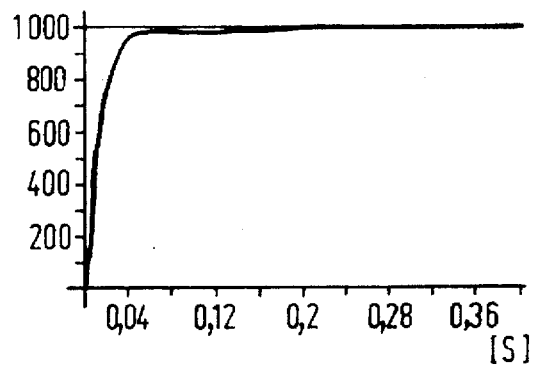
Figure 7:
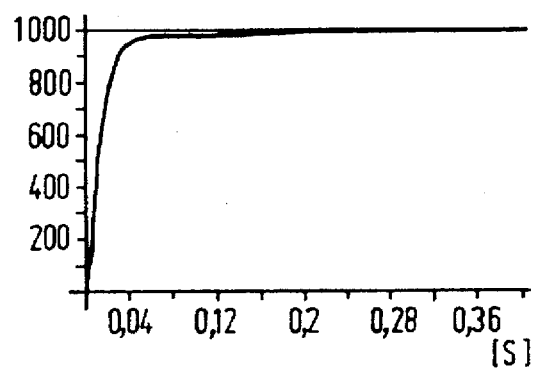
Figure 7:
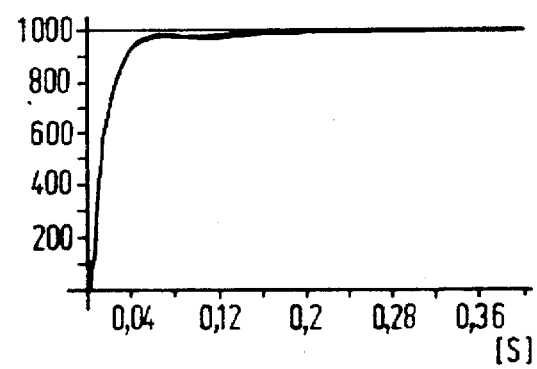

The variations which are performed in the above adaptive steps until an optimum is obtained, are shown in detail one after the other respectively, in the diagrams of FIGS. 7A–7S. This is an example for obtaining an optimum using a pure proportional-integral controller which is set to have a proportional amplification $V_r$=0.001 which is too high resulting in a non-monotoneous increase, which further has a resetting time of $T_n$=0.05 ms for the integral share which is too small resulting in an overshoot of the step response. It is indicated for each step how the proportional and the integral share are varied, which may be summarized as follows:

INITIAL STEP RESPONSE (FIG. 7A)

PI controller with $V_r$=0.001, $T_n$=50 ms
Evaluation values for coarse optimizing $V_r$:
  Monotony value q=2
  Limit cycle gr_max=1.0031
Results in varying amplification: dvr=0.6667

STEP 1 (FIG. 7B)

PI controller with $V_r$=0.0007, $T_n$=50 ms
Evaluation values for coarse optimizing $V_r$:
  Monotony value q=0
  Limit cycle gr_max=1.0038
Results in varying amplification: dvr=1
Thus coarse optimizing finished

STEP 2 (FIG. 7C)

PI controller with $V_r$=0.0007, $T_n$=50 ms
Evaluation values for optimizing $T_n$:
  Overshoot ueber=1.0819
Results in varying resetting time: dtn=1.5

STEP 3 (FIG. 7D)

PI controller with $V_r$=0.0007, $T_n$=75 ms
Evaluation values for optimizing $T_n$:
  Overshoot ueber=1.0284
Results in varying resetting time: dtn=1.0355

STEP 4 (FIG. 7E)

PI controller with $V_r$=0.0007, $T_n$=77.6638 ms
Evaluation values for optimizing $T_n$:
  Overshoot ueber=1.024
Results in varying resetting time: dtn=1.0543

STEP 5 (FIG. 7F)

PI controller with $V_r$=0.0007, $T_n$=81.8822 ms
Evaluation values for optimizing $T_n$:
  Overshoot ueber=1.0176
Results in varying resetting time: dtn=1.0386

STEP 6 (FIG. 7G)

PI controller with $V_r$=0.0007, $T_n$=85.0403 ms
Evaluation values for optimizing $T_n$:
  Overshoot ueber=1.013
Results in varying resetting time: dtn=1.0286

STEP 7 (FIG. 7H)

PI controller with $V_r$=0.0007, $T_n$=87.469 ms
Evaluation values for optimizing $T_n$:
  Overshoot ueber=1.0095
Results in varying resetting time: dtn=1
Thus optimizing $T_n$ finished

STEP 8 (FIG. 7I)

PI controller with $V_r$=0.0007, $T_n$=87.469 ms
Evaluation values for fine optimizing $V_r$:
  Monotony value q=0
  Limit cycle gr_max=1.0095
Results in varying amplification: dvr=0.9987

STEP 9 (FIG. 7J)

PI controller with $V_r=0.000665$, $T_n=87.469$ ms
Evaluation values for fine optimizing $V_r$:
  Monotony value $q=0$
  Limit cycle gr_max=1.0098
Results in varying amplification: dvr=1.0835

STEP 10 (FIG. 7K)

PI controller with $V_r=0.000721$, $T_n=87.469$ ms
Evaluation values for fine optimizing $V_r$:
  Monotony value $q=0$
  Limit cycle gr_max=1.0031
Results in varying amplification: dvr=1
Thus fine optimizing terminated

STEP 11 (FIG. 7L)

PI controller with $V_r=0.000721$, $T_n=87.469$ ms, without applying disturbance
Evaluation values for optimizing $r_x$:
  Ripple content well=10
  Diff. Maximum-Minimum minmax=1.0109
  Overshoot ueber=1.01114
Results in additionally applying disturbance variable $r_x=-0.008$

STEP 12 (FIG. 7M)

PI controller with $V_r=0.000721$, $T_n=87.469$ ms, with applying disturbance var. $r_x=-0.008$
Evaluation values for optimizing $r_x$:
  Ripple content well=3
  Diff. Maximum-Minimum minmax=0.0637
  Overshoot ueber=1.0145
Results in varying disturbance applied: drx=0.9031

STEP 13 (FIG. 7N)

PI controller with $V_r=0.000721$, with applying disturbance var. $r_x=-0.00722$
Evaluation values for optimizing $r_x$:
  Ripple content well=3
  Diff. Maximum-Minimum minmax=0.0236
  Overshoot ueber=1.9855
Results in varying disturbance applied: drx=0.9077

STEP 14 (FIG. 7O)

PI controller with $V_r=0.000721$, $T_n=87.469$ ms. with applying disturbance var. $r_x=-0.00655$
Evaluation values for optimizing $r_x$:
  Ripple content well=3
  Diff. Maximum-Minimum minmax=0.0078
  Overshoot ueber=0.9741
Results in varying disturbance applied: drx=0.6669

STEP 15 (FIG. 7P)

PI controller with $V_r=0.000721$, $T_n=87.469$ ms, with adding disturbance $r_x=-0.00437$
Evaluation values for optimizing $r_x$:
  Ripple content well=5
  Diff. Maximum-Minimum minmax=0.0035
  Overshoot ueber=0.9840
Results in applying disturbance varied: drx=0.8935

STEP 16 (FIG. 7Q)

PI controller with $V_r=0.000721$, $T_n=87.469$ ms, with applying disturbance $r_x=-0.00391$
Evaluation values for optimizing $r_x$:
  Ripple content well=7
  Diff. Maximum-Minimum minmax=0.0035
  Overshoot ueber=0.9869
Results in applying disturbance varied: drx=0.8967

STEP 17 (FIG. 7R)

PI controller with $V_r=0.000721$, $T_n=87.469$ ms, with applying disturbance $r_x=-0.0035$
Evaluation values for optimizing $r_x$:
  Ripple content well=9
  Diff. Maximum-Minimum minmax=0.0039
  Overshoot ueber=0.9897
Results in varying disturbance: drx=0.8745

OPTIMUM (FIG. 7S)

PI controller with $V_r=0.000721$, $T_n=87.469$ ms, with applying disturbance $r_x=-0.00306$
Evaluation values for optimizing $r_x$:
  Ripple content well=9
  Diff. Maximum-Minimum minmax=0.0041
  Overshoot ueber=0.9924
Results in varying disturbance: drx=1, i.e., end of optimizing. Step 11 shows that the step response is evaluated with respect to the disturbance value and thus the factor $r_x$ is varied. Subsequently, up to the optimum of step 18 further variations of the disturbance value are performed as shown in FIGS. 7A–7S in detail.

| Listing of abbreviations: | |
|---|---|
| $\ddot{F}$, F" | second differentiation of force |
| $\dot{F}$, F' | first differentiation of force |
| $\bar{F}$ | arithmetic mean value |
| $F_{Grenzmax}$ | maximum amplitude of the limit cycle |
| $\hat{F}_{Grenzmax}$ | standardized maximum amplitude of limit cycle |
| $\hat{F}_{max}$ | standardized maximum actual force value |
| bew | evaluation factor for the progressive increase of the monotony value |
| c | spring rate |
| drx | final controller output for varying $r_x$ (multiplicative factor) |
| DRX_MAXMIN | upper tolerance range limit for drx |
| DRX_MINMIN | lower tolerance range limit for drx |
| dtn | final controller output for varying the integral share (multiplicative factor) |
| dvr | final controller output for varying the proportional share (multiplicative factor) |
| DVR_MAXMIN | upper tolerance range limit for dvr |
| DVR_MINMIN | lower tolerance range limit for dvr |
| F | force |
| gr_max | standardized maximum amplitude of limit cycles |
| gr_zyk | measure for limit cycles |
| grenz | measure for limit cycles |
| GRENZ_MAX | tolerance limit for the amplitude of limit cycle |
| GRENZ_MAXMIN | maximum allowable value for minmax |
| minmax | relative difference between first maximum of actual force value and subsequently following minimum |
| q, qf | measure for the monotony behavior in the increase portion of the actual force value |
| qp | monotony value in the previous step |
| s | distance |
| t_stat | instant of reaching the stationary final value |
| t_ueber | instant of the maximum actual value |

Listing of abbreviations:

| | |
|---|---|
| tein | initial control time (actual force value "enters" the tolerance range) |
| tein1 | initial control time (actual force value leaves lower tolerance range limit) |
| $t_{intervall}$ | time period of an intervall |
| ueber | measure standardized to desired value for overshoot or term of an linguistic variable |
| UEBER_MAX | upper limit of tolerance range for overshoot |
| UEBER_MIN | lower limit of tolerance range for overshoot |
| UEBER_MIN_RX | lower tolerance limit for overshoot while optimizing rx |
| ueberp | overshoot in the previous step |
| well | measure for the ripple content in the increase portion of the actual force value |
| x | force |

We claim:

1. A method of adaptive adjustment of a controller for controlling the force applied to a load along an axis of motion by a moving member of an electro-hydraulic system which includes a controller having a proportional section and an integral section, by varying control parameters of the proportional and integral sections in response to adaptive adjustment using fuzzy-set-logic, said method comprising the steps of:

applying to the controller a desired value of force to be applied to the load;

measuring an actual value of force applied to the load resulting from application to the controller of the desired value of force;

detecting the step response of the actual value of force;

applying to the controller the step response;

evaluating, by use of fuzzy-set-logic, geometrical characteristics of the step response, including overshoot, monotony value and limit cycle;

compensating the overshoot characteristic by suitable variation of the integral section of the controller;

compensating the monotony value and the limit cycle characteristics by suitable variation of the proportional section of the controller;

the compensating steps being carried out by varying the control parameters in accordance with a setting sequence selected as follows:

(a) measuring the monotony value up to the instant of the maximum overshoot followed by setting the proportional amplification to bring the value measured toward zero to achieve rough optimizing;

(b) setting the integral section of the controller such that a maximum allowable overshoot is obtained at a high dynamic; and (c) measuring the monotony value up to an initial control time and subsequently setting the proportional amplification to achieve fine optimizing; and repeating the steps of evaluating and compensating in optimizing the step response.

2. The method of claim 1, wherein the ripple content of the step response is evaluated and is compensated by applying a disturbance variable representative of the speed of the controlled system.

3. The method of claim 2, characterized by the further step of:

(d) activating and optimizing the application of the disturbance variable as a last step in the setting sequence.

4. The method of claim 3, characterized by measuring the ripple content and the overshoot, and varying the disturbance variable application by selecting a multiplicative factor $r_x$.

5. The method of claim 1, wherein zero is selected to be the maximum value for the allowable overshoot.

6. The method of claim 1, wherein the step (a) is supplemented by further optimizing the proportional section in response to the maximum amplitude of the limit cycle which is determined by an upper limit of the tolerance range for the overshoot.

7. The method of claim 1, wherein the step (c) is supplemented by optimizing the proportional section in response to the maximum amplitude of the limit cycle which is determined by a tolerance limit for the amplitude of the limit cycle and which is smaller than the upper limit of the tolerance range for the overshoot.

8. The method of claim 7, wherein the difference between the first maximum of the overshoot of the step response and the following minimum is determined, and wherein the multiplicative factor for the disturbance variable application of the speed is set to a maximum allowable value of the tolerance limit for the amplitude of the limit cycle.

9. The method of claim 1 or 2, wherein, for evaluating the success of optimizing, an operator is determined representing a relation between improving the optimizing result and the number of the optimizing steps in order to terminate the optimizing process in response to an increasing number of optimizing steps.

* * * * *